United States Patent [19]

Reitz

[11] Patent Number: 5,190,624
[45] Date of Patent: Mar. 2, 1993

[54] ELECTROHEOLOGICAL FLUID CHEMICAL PROCESSING

[75] Inventor: Ronald P. Reitz, Hyattsville, Md.

[73] Assignee: The United States of America as represented by the Secretary of the Navy, Washington, D.C.

[21] Appl. No.: 617,317

[22] Filed: Nov. 23, 1990

Related U.S. Application Data

[63] Continuation-in-part of Ser. No. 219,522, Jul. 15, 1988, and a continuation-in-part of Ser. No. 219,523, Jul. 15, 1988, abandoned, and a continuation-in-part of Ser. No. 405,178, Sep. 11, 1989, and a continuation-in-part of Ser. No. 584,836, Nov. 5, 1990, abandoned.

[51] Int. Cl.$^5$ ............................................. C25B 3/00
[52] U.S. Cl. ................................... 204/59 R; 204/72; 204/131; 252/62.9; 252/500
[58] Field of Search ................ 204/59 R, 72, 131; 252/629, 500; 264/22, 25, 26, 27

[56] References Cited

U.S. PATENT DOCUMENTS

| | | | |
|---|---|---|---|
| 4,129,513 | 12/1978 | Stangroom | 252/77 |
| 4,737,886 | 4/1988 | Pedersen | 252/73 |
| 4,900,387 | 2/1990 | Johnson | 156/272.2 |

Primary Examiner—John Niebling
Assistant Examiner—Kathryn Gorgos
Attorney, Agent, or Firm—Luther Marsh; Charles Miller

[57] ABSTRACT

The present invention comprises electrorheological fluids and processes. Applying an electric field to an electrorheological fluid composition electrically controls chemical reactions therein. The chemical reactions may comprise those wherein the acidity of the composition is changed. Other chemical reactions may comprise those wherein the phase of the composition is changed.

6 Claims, No Drawings

ELECTROHEOLOGICAL FLUID CHEMICAL PROCESSING

The invention described herein may be manufactured by or for the Government of the United States without payment on any royalties thereon or therefor.

CROSS REFERENCE TO RELATED APPLICATIONS

This application is a continuation in part of my copending patent applications Ser. No. 07/219,522 and 07/219,523, now abandoned both filed Jul. 15, 1988 and a continuation in part of my copending application Ser. No. 07/405,178 filed Sep. 11, 1989 and a continuation in part of my copending patent application Ser. No. 07/584,836 filed Nov. 5, 1990, now abandoned.

BACKGROUND OF THE INVENTION

1. Field of the Invention

This invention relates to the field of composition of materials and articles that have one or more properties of the composition or article electrically induced and more particularly to chemical processes that can be electrically induced in electrorheological fluids and electroset materials.

2. Background Information

The invention disclosed herein is a continuation in part of work previously accomplished and for which copending patent applications were filed on Jul. 15, 1988 as Ser. Nos. 07/219,522 entitled Induced Dipole Electroviscous Fluids and 07/219,523 entitled Photoelectroviscous Fluids and on Sep. 11, 1989 as Ser No. 07/405,178 entitled Electroset Compositions and Articles and on Nov. 5, 1990 as Ser. No. 07/584,836 entitled Programmable Electroset Materials and Processes, the disclosures of which are hereby incorporated by reference. In particular, my earlier copending applications have disclosed electroviscous fluids and aggregates useful in electroviscous fluids. A later copending application disclosed a series of compounds utilizing, in part, the aggregates disclosed in my earlier copending applications. The term aggregate is used in the collective to include a multiplicity of electrically polarizable aggregate particles, said particles comprising the particulate of electrorheological fluids. In my copending applications, the term electroviscous aggregate has been used to describe an aggregate which, when placed in a dielectric fluid, causes the combination of fluid and aggregate to behave electroviscously. In my still later copending application and in this application, the term electroheological aggregate is used in a similar manner.

U.S. Serial Nos. 07/405,178 and 07/584,836, have disclosed the second group of Reitz effects associated with the accelerated curing of electroset materials and the programming of electroset materials. At the time of filing co-pending application Ser Nos. 07/405,178 and 07/584,836, the effect of accelerating the cure of a compound and electrically programming into a compound desired physical and mechanical properties was known. It was not and still is not known, however, how such effects were manifest within these electroset materials. Furthermore, electroset materials are castable compounds that can harden into solid objects without the application of an electric field. Such art is limited to castable compounds only. The present invention is advantageous over the prior art in that chemical reactions within an electrorheological fluid can be controlled without the non-energized electrorheological fluid hardening into a solid object. In fact, the present invention can be employed in such a manner as to result in chemical products that are not solids even after an electric field has been applied to and then removed from the electrorheological fluid. This means that the electrorheological fluid which is intended to be used for chemical processing can be stored over long periods of time. Such electrorheological fluids can be stored for a long period of time and then later used for controlling chemical reactions and processes.

Prior art teaches that electrically induced polymerization of organic compounds can be accomplished within a monomer between charged electrode surfaces which are composed of substances which can form pi-complexes with organic compounds. Such processes, found in U.S. Pat. No. 3,629,083, are limited in that the monomer is placed in an inert atmosphere. Polymers resulting from the use of this process are formed only as a result of charges being extracted from the surface of the electrodes. They are not the result of charged particles, dipoles, ions and the like which form WITHIN the monomer.

Numerous teachings concerning chemical reactions are found in readily available references such as Chemistry authored by Gillespie, Humphreys, Baird and Robinson and published by Allyn and Bacon, Inc. of Boston, Mass. (copyright 1986); A Brief Review in Chemistry, authored by Patrick Kavanah and published by Cebco Standard Publishing of Fairfield, N.J. (3rd edition, copyright 1981); Organic Chemistry authored by Morrison and Boyd and published by Allyn and Bacon, Inc. of Boston, Mass. (3rd edition, copyright 1973) and Vitalized Chemistry authored by Henry Dorin and published by the College Entrance Book Company of New York, N.Y. (5th edition, copyright 1964). Prior art of corona and electric discharge attempts to treat materials wherein such chemical reactions occur are known and use of such processes are taught in U.S. Pat. Nos. 4,649,097; 4,966,666 and 4,940,894. While such teachings, processes and apparatus are useful, all are limited in that they form charges and ions that enter into the altered material from an origin external to the material. The charges and ions formed by discharge and corona processes are emitted from the energizing electrodes themselves and DO NOT originate from WITHIN the material to be processed and polymerized or formed. As a result, both the discharge processes and corona processes are severely limited as methods to electrically initiate or control chemical reactions within the material. These processes often require that the dielectric strength of the processed material be exceeded, thus resulting in a corona or a discharge due to dielectric breakdown. For this reason, enormous voltages are required for materials of significant thickness to be so formed. It is therefore impractical to employ such methods when electrically initiating or, alternatively, electrically controlling chemical reaction in a material of significant thickness.

Furthermore, the known corona and discharge processes cannot easily nor even effectively manipulate many intermolecular interactions which govern the results of many chemical reactions. As taught on pages 470 to 478 of Chemistry, many intermolecular forces involve the interaction between ions and dipoles, ions and dipoles induced by the presence of those ions, dipoles and dipoles, dipoles and other dipoles that are induced by the presence of the first dipoles, and the so-called London forces, a term which describes induced dipole-induced dipole interactions, said first induced dipoles and said second induced dipoles resulting from naturally occurring fluctuations within nonpolar molecules. All of these interactions are a result of electrostatic forces within the material.

Because there are so many nonpolar materials and intermolecular interactions that are possible in nature, it is desirable to have the means of effectively electrically controlling these interactions through the means of imposing an external electric field across these materials to initiate reactions and cause reactions WITHIN the materials. Known corona and electric discharge processes are ineffective because dipole-dipole interactive forces and induced dipole-induced dipole interactive forces have a $1/r^7$ dependence on distance away from said dipoles. Their resultant electric fields are thus negligable at distances of 3 r, wherein r is distance from the midpoint of one dipole to the midpoint of another dipole. As a result, there is negligable affect in non-electrorheological fluid materials by imposition of an electric field across a material thickness of 3 rave or more wherein rave is the average distance between the midpoint of a dipole and its nearest neighbor dipole. Thus, establishment and control of an electric field across a non-electrorheological fluid of 3 rave thickness or more is ineffective for non-electrorheological fluids within which these dipole-dipole interactions and induced dipole-induced dipole interactions take place.

It is now known, however, that electrorheological fluids can solidify electrically BY THE CREATION OF INDUCED DIPOLES WITHIN THE FLUID due to the establishment of an electric field across said fluid by external means. The induced dipoles thus formed are established throughout the fluid material medium and are therefore in close enough proximity to other dipoles within the fluid medium to effect control of intermolecular chemical reactions therein.

It is well established in the science of chemistry that the extent to which a chemical reaction will proceed, the rate of the reaction and even the kind of chemical reaction that occurs is often appreciably affected by the solubility of one or more constituents in a composition.

The extent to which a material is soluble is often expressed in the well-known solubility constant which is taught on page 576 of Chemistry. It is also well established that the solubility of some materials is dependent upon the acidity (in pH) of a solution, which is taught in pages 577 to 584 of Chemistry. This reference further teaches that the precipitation of a salt from a solution can be selective by selecting an appropriate pH for a specific solution. Other examples of chemical reactions affected by the pH include reactions with aromatic rings (p. 751 of Organic Chemistry), the cleavage of ethers (p. 559 of Organic Chemistry), the coupling of diazonium salt and a phenol [or alternatively an amine] as taught on page 773 of Organic Chemistry, the rate of enzyme-catalyzed hydrolysis (p. 1167 of Organic Chemistry), the addition of certain derivatives of ammonia as taught in pages 639-640 of Organic Chemistry and dissolving (solubility) of carbonates as taught in page 581 of Chemistry.

Aromatic rings are activated toward electrophilic substitution by base-strengthening substituents and are deactivated toward electrophilic substitution by base weakening substituents. The cleavage of ethers (with the notable exception of epoxides) can only be accomplished with acids and NOT bases. The coupling of diazonium salt to a phenol can be successfully accomplished with the adjustment of the coupling medium to the right degree of acidity (i.e. the proper pH). Enzyme-catalyzed hydrolysis changes as the acidity of the reaction medium changes. Adjusting the reaction medium to just the right acidity is important to the addition of derivatives of ammonia.

Another example of a pH sensitive reaction is the Cannizzario reaction as taught in Organic Chemistry in sections 19.16 and 21.5 (3rd edition). These sections teach that Aldol condensation cannot take place if the aldehyde or ketone in the reaction does not contain an alpha-hydrogen. In a dilute base, there is no reaction. In concentrated base, however, they may undergo the Cannizzaro reaction.

It is, therefore, desirable to have a means of electrically controlling the pH of an electrorheological fluid or, alternatively, controlling the pH of the constituents of an electrorheological fluid. Such electrical control of pH may be used to control the solubility of constituents within an electrorheological fluid and thereby can control the resulting chemical reactions and products thereof.

It is taught in Vitalized Chemistry page 164 that the solubility of a salt in a specific solvent is dependent upon the polarizability of the solvent. To quote Dorin from page 164 of Vitalized Chemistry, "It is this polar property that accounts for the solvent power of water for so many substances." But this is only part of the story of solubility. In Chemistry, pages 481 to 484, it is taught that polar substances are soluble in polar liquids and that nonpolar substances are soluble in nonpolar liquids. "Like dissolves like" is taught in this reference.

It is also taught in application 07/219,522 that dipoles are induced or created in the particulate of an electroviscous fluid when an electric field is applied to said electroviscous fluid. The creation or induction of these dipoles does more than change the effective viscosity of the electroviscous (EV) fluid. It causes a polarization throughout the fluid and creates dipole charges within the electroviscous fluid.

An electroviscous fluid (also called electrorheological fluid) comprises a dielectric fluid and electrically polarizable particulate immersed within and suspended throughout said dielectric fluid. Applying a voltage to two electrodes in contact with an electroviscous fluid causes the electrical induction or formation of dipoles in or on the surface of said particulate or aggregate. The electroviscous fluid thus becomes "polarized", a condition which changes the overall solvent characteristics of the EV fluid.

Without the field inducing dipoles within the particulate or aggregate, the EV fluid would be much less polarized, and therefore, its overall solvent characteristics would be appreciably different than when it is electrically energized.

As taught on page 470 of Chemistry, there are interactions between ions and dipoles in some materials. These interactions have a dependence of force on distance of $1/r^3$ where r is the distance between the center of the ion and the midpoint of the dipole. These dipoles are permanent dipoles which are characteristic of some of the constituents of the material wherein these intermolecular interactions occur.

It is noteworthy that ions within a material can induce dipoles in other nearby molecules. However, since these are ion induced, the ion-induced dipole interactive forces have a dependence of force on distance of $1/r^5$ wherein r is the distance between the center of the ion and the midpoint of the dipole.

As taught in my prior application serial no. 07/219,522, dipoles can be induced within an electrorheological fluid by applying an electric field to said electrheological fluid. These induced dipoles are NOT those created by the presence of a nearby ion. They are created by immersing the electrorheological in an electric field of EXTERNAL origin such as the charging of electrodes between which is the electrorheological fluid. (This is possible in non-electrorheological fluids.) Because these induced dipoles are created by external means, the electrical forces associated with said induced dipoles can be made much stronger (with a $1/r^3$ dependence) than those produced by the proximity of an ion. Thus, the strength of the electrical forces associated with the interaction of an ion and an externally created induced dipole within an electrorheological fluid can be used to effectively initiate (or, alternatively, to control) the interactions between ions and dipoles and between ions and induced dipoles. For example, the externally generated induced dipoles (i.e. those resulting from the application of an electric field to an electrorheological fluid) can be used to control the migration of ions within said electrorheological fluids. Thus, the concentration of ions within various regions of the electrorheological fluid can be easily manipulated to control chemical reactions within said electrorheological fluid. Such ion concentration manipulations in a non-electrorheological fluid are possible only in thin fluids. Manipulation of ion concentrations within non-electrorheological fluids requires prohibitively high electric fields and is, therefore, impractical.

Many chemical reactions are dependent upon the concentration of various constituents in the reaction. As taught on pages 82, 87 and 145 in A Brief Review in Chemistry (3rd edition), the concentration of chemical substances affects the rate of chemical reactions, the substances produced by chemical reactions and the chemical equalibrium conditions associated with chemical reactions.

It is, therefore, advantageous and desirable to electrically initiate (or alternatively, to control) ion-dipole interactions within an electrorheological fluid.

The present invention uses the polarizability of an electrorheological fluid, the induction of dipoles in the particulate (which is also called aggregate) of said electrorheological fluid and the ability to cause changes in the pH within the electrorheological fluid to control chemical processes occurring therein. Numerous chemical processes within an electrorheological fluid have been found to be affected by the electrical activation of an electrorheological fluid, some of which are discussed in the detailed description of the preferred embodiments of this disclosure. The present invention employs the electrical control of the polarizability of electrorheological (also called electroviscous) fluids and the ability to electrically control the pH of an electrorheological fluid in order to electrically control chemical reactions within said electrorheological fluid. The present invention employs the use of dipole induction within an electrorheological fluid to control ion migration and ion concentrations within said electrorheological fluid. It uses electrically controlled chemical reactions within an electrorheological fluid that can be stored for long periods of time without setting and curing. In this disclosure, the term "electrorheological" and "electroviscous" will be used interchangeably and refer to the same materials.

OBJECTS OF THE INVENTION

It is an object of the invention to provide a means of electrically controlling the acidity (pH) of a fluid thereby controlling chemical reactions taking place therein.

It is another object of the invention to provide a means of electrically controlling the solubility of chemical substances.

It is still another object of the invention provide means to electrically control the products of chemical reactions.

It is yet another object of the invention to provide means to control the rate at which a chemical reaction proceeds.

It is still yet another object of the invention to provide an electrorheological means to control electric dipole affected chemical reactions.

It is still yet a further object of the invention to provide means whereby said electrorheological fluids can be stored for long periods of time before electrically initiating a chemical reaction within said electrorheological fluid.

These and other objects, features and advantages of the present invention will become apparent from a consideration of the following detailed description and examples.

DETAILED DESCRIPTION OF PREFERRED EMBODIMENTS

An electric probe comprising two electrodes with a spacing gap of 3 to 4 millimeters (mm) was used in the following examples. The construction of the probe and procedure for energizing the probe are disclosed in my copending application 07/219,522. In the test results reported herein, the probe consisted of two aluminum plates, each having a surface area of about one square inch (about 6.5 $cm^2$) and a spacing of about 3 to 4 mm.

EXAMPLE 1

An electrorheological composition comprising 30 ml dimethyl silicone oil (50 cs), manufactured by Dow Corning and sold under the brand name SF200, was mixed in a 100 ml beaker with 15 ml Giant brand ground cinnamon and 10 drops of Giant brand Sudsy Ammonia. Giant brand products are distributed by Giant Foods, Inc. of Landover, Md. After mixing thoroughly, 15 ml of the mixture was poured into a first 50 ml beaker and another 15 ml of the mixture was poured into a second 50 ml beaker.

An electric probe as described above was inserted into the mixture in the second beaker. The probe was then energized with a voltage of 5 kilovolts. The probe was then removed from the mixture, and it was observed that the mixture between the electrodes had solidified via the Winslow effect. It was also observed that the energized electrorheological fluid seemed to "quiver", and tiny particles therein seemed to swarm around in different directions therein.

After 7 minutes, the probe was inserted into a third 50 ml beaker, and the voltage to the probe was removed. The composition between the electrodes became fluid again and poured into the test beaker and about 0.5 ml of this fluid was mixed with 4.5 ml of 50 cs SF 200 dimethyl silicone oil.

After mixing the 4.5 ml of SF 200 with the 0.5 ml of the electrorheological fluid that had been electrified, a test sample of about approximately 1 ml of this mixture was then poured into a plastic test beaker. Then, 4 ml of the 50 cs SF200 was added to the 1 ml test sample and mixed.

Afterward, 2 drops of Bromoblue were mixed with the test mixture. It was observed that the particulate in the test mixture from the electrified electrorheological fluid was light brown, indicating that the particulate was acidic (i.e. low pH).

Afterward, 0.5 ml of the mixture from the first 50 ml beaker was added to 4.5 ml of 50 cs SF 200. After this was mixed, a test sample of about approximately 1 ml of this mixture was then poured into another plastic test beaker. Then, 4 ml of the 50 cs SF200 was added to the 1 ml test sample and mixed.

Afterward, 2 drops of Bromoblue were mixed with the test mixture. It was observed that the particulate from the unenergized electrorheological fluid was blue, indicating that this particulate was basic (i.e. high pH).

The plastic test beaker and the Bromoblue were provided in a pH test kit that applicant purchased at The Beltway Aquarium pet store located in Greenbelt, Md. The pH test kit is manufactured by Silco Pet Products Company located in Alexandria, Va.

This example demonstrates that the electrification of this electrorheological fluid composition changed the pH of said composition from basic pH to acidic pH. This demonstrates that the pH of electrorheological fluid composition can be controlled electrically. It further demonstrates that electrification of an electrorheological fluid can control a chemical reaction that results in acidic chemical substances within said electrorheological fluid.

EXAMPLE 2

An electrorheological composition comprising 30 ml Giant brand Spanish Olive Oil was mixed in a 100 ml beaker with 15 ml Giant brand ground cinnamon and 10 drops of Giant brand Sudsy Ammonia. Giant brand products are distributed by Giant Foods, Inc. of Landover, Md. After mixing thoroughly, 15 ml of the mixture was poured into a first 50 ml beaker and another 15 ml of the mixture was poured into a second 50 ml beaker.

An electric probe as described above was inserted into the mixture in the second beaker. The probe was then energized with a voltage of 5 kilovolts. The probe was then removed from the mixture, and it was observed that the mixture between the electrodes had solidified via the Winslow effect. It was also observed that the energized electrorheological fluid seemed to "quiver", and tiny particles therein seemed to swarm around in different directions therein.

After 7 minutes, the probe was inserted into a third 50 ml beaker, and the voltage to the probe was removed. The composition between the electrodes became fluid again and poured into the test beaker and about 0.5 ml of this fluid was mixed with 4.5 ml of Giant brand Spanish Oil.

After mixing the 4.5 ml of Giant brand olive oil with the 0.5 ml of the electrorheological fluid that had been electrified, a test sample of about approximately 1 ml of this mixture was then poured into a plastic test beaker. Then, 4 ml of the 50 cs SF200 was added to the 1 ml test sample and mixed.

Afterward, 2 drops of Bromoblue were mixed with the test mixture. It was observed that the particulate in the test mixture from the electrified electrorheological fluid was light brown, indicating that the particulate was acidic (i.e. low pH).

Afterward, 0.5 ml of the mixture from the first 50 ml beaker was added to 4.5 ml of Giant brand Spanish Olive Oil. After this was mixed, a test sample of about approximately 1 ml of this mixture was then poured into another plastic test beaker. Then, 4 ml of the olive oil was added to the 1 ml test sample and mixed.

Afterward, 2 drops of Bromoblue were mixed with the test mixture. It was observed that the particulate from the unenergized electrorheological fluid was blue, indicating that this particulate was basic (i.e. high pH).

This example demonstrates that the electrification of this electrorheological fluid composition changed the pH of said composition from basic pH to acidic pH. This demonstrates that the pH of electrorheological fluid composition can be controlled electrically. It further demonstrates that electrification of an electrorheological fluid can control a chemical reaction that results in acidic chemical substances within said electrorheological fluid.

EXAMPLE 3

A composition of 15 ml of Giant Food brand Corn oil, 7.5 ml flour, which was purchased at the local Giant Food Store in Lanham, Maryland, and 1 ml albumin (i.e. egg white from eggs purchased at the Lanham Giant Food Store) was mixed in a 50 ml beaker. An electric probe of similar dimensions to that used in examples 1 and 2 was immersed in the mixture, and the probe was charged to 1.5 kilovolts. The probe was removed from the beaker, and it was noted that the electrorheological fluid between the probe had solidified via the Winslow effect. After 3 minutes, the voltage was removed. It was observed that the fluid between the electrodes had undergone a chemical reaction that resulted in the electrorheological fluid being permanently solidified into an article, the size and shape of which had the same dimensions as the gap between the electrodes. The remainder of the mixture, which was still in the 50 ml beaker, was left at room temperature and atmospheric conditions for 3 weeks. It was noted after that time that, although the electroviscous particulate within the fluid had settled out, the mixture was still a fluid. After stirring, the probe was again inserted into the mixture and energized to 1.5 kilovolts. After 3 minutes the voltage was removed. It was observed that the fluid between the electrodes had undergone a chemical reaction that resulted in the electrorheological fluid being permanently solidified into an article; the size and shape of which had the same dimensions as the gap between the electrodes.

This example demonstrates that an electrorheological fluid can be stored for a long periods of time before electrically initiating a chemical reaction within said electrorheological fluid, said chemical reaction resulting in the permanent solification of said electrorheological fluid.

EXAMPLE 4

A composition of 25 ml Corn oil, 15 ml cinnamon, 1 ml grain alcohol (180 proof) and 1.5 ml Giant brand Acrylio Floor Finish was mixed in a 50 ml beaker. The Corn oil, cinnamon, and acrylic floor finish were all purchased at the Giant Food Store in Lanham, Maryland and are all sold under the Giant Brand.

An electric probe of similar dimensions to that used in examples 1 and 2 was immersed in the mixture, and the probe electrodes were charged to 2 kilovolts. The probe was removed from the beaker, and it was noted that the electrorheological fluid between the probe had solidified via the Winslow effect. After 3 minutes, the voltage was removed. It was observed that the fluid between the electrodes had undergone a chemical reaction that resulted in the electrorheological fluid being permanently solidified into an article, the size and shape of which had the same dimensions as the gap between the electrodes. It was also noted that foaming within the electrorheological fluid had taken place during the 3 minutes that the voltage had been applied. This resulted in an article, the size and shape of which had the same dimensions as the gap between the electrodes and which had visible voids within.

This demonstrates that articles can be fabricated with electrorheological fluid controlled chemical processing.

It will be appreciated by those skilled in the art in light of this disclosure that many other kinds of chemical reactions can be initiated and many others controlled within an electrorheological fluid without departing from the scope of the present invention. Further, it is appreciated that many other forms of shapes and molds for shapes may be made by practising the principles of this invention. It is to be understood that the embodiments herein described are only illustrative of the application of the principles of the invention and that numerous modifications, alternative embodiments and arrangements may be readily devised by those skilled in the art in light of this disclosure without departing from the spirit and scope of this invention. It is therefor to be understood that within the scope of the appended claims, the invention may be practiced otherwise than as specifically described herein.

What is claimed is:

1. A process for electrically controlling chemical reactions within an electrorheological fluid comprising:
   providing an electrorheological fluid composition having chemical reactants dispersed therein, said reactants being responsive to an electric field such that said reactants will chemically react upon exposure of said composition to an electric field and chemically alter said composition;
   applying an electric field to said composition from an electrical source such that said composition is chemically altered.

2. A process as defined in claim 1 wherein said chemical reaction results in a change of the pH of at least a portion of said composition.

3. A process as defined in claim 1 wherein said electrorheological fluid composition in the absence of an applied electric field, does not undergo permanent phase change from fluid phase to solid phase and wherein said electrorheological fluid composition is responsive to application of electric field thereto such that during said process, said chemical alteration results in at least the partial permanent solidification of said composition.

4. A process as defined in claim 1 wherein the solubility of said chemical reactants is responsive to the application of said electric field.

5. A process as defined in claim 1 wherein said chemical reaction results in the substantial permanent solidification of said composition.

6. A process as claimed in claim 1 further comprising a process wherein an acid is formed within said electrorheological fluid composition in response to said application of an electric field.

* * * * *